United States Patent
Burr et al.

(10) Patent No.: US 6,945,377 B2
(45) Date of Patent: Sep. 20, 2005

(54) INTEGRATED POSITION SWITCH/BRAKE TRANSMISSION SHIFT INTERLOCK COMPONENT

(75) Inventors: Larry W. Burr, Saginaw, MI (US); Frederick J. Berg, Auburn, MI (US); Kenneth G. Johnston, Freeland, MI (US); Barry L. Hoffman, Saginaw, MI (US); Michael C. Vermeersch, Saginaw, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/394,073

(22) Filed: Mar. 21, 2003

(65) Prior Publication Data
US 2003/0213673 A1 Nov. 20, 2003

Related U.S. Application Data
(60) Provisional application No. 60/368,333, filed on Mar. 27, 2002.

(51) Int. Cl.[7] ............................................. B60K 41/26
(52) U.S. Cl. .................................. 192/220.2; 74/473.24
(58) Field of Search ......................... 192/220.2, 220.7; 477/94, 96; 74/473.21, 473.24

(56) References Cited

U.S. PATENT DOCUMENTS

| | | | | |
|---|---|---|---|---|
| 4,976,171 A | * | 12/1990 | Sharp et al. | 192/220.2 |
| 5,022,504 A | * | 6/1991 | Kobayashi | 192/220.2 |
| 5,133,436 A | * | 7/1992 | de Crouppe et al. | 192/220.2 |
| 5,176,231 A | * | 1/1993 | Moody et al. | 192/220.2 |
| 5,314,049 A | * | 5/1994 | Nordstrom | 477/96 |
| 5,647,818 A | * | 7/1997 | Moody | 74/473.24 |
| 6,443,026 B1 | * | 9/2002 | Arakawa et al. | 192/220.2 |
| 6,508,090 B1 | * | 1/2003 | Hasegawa et al. | 477/99 |
| 6,592,492 B1 | * | 7/2003 | Kalia | 477/96 |
| 2004/0110600 A1 | * | 6/2004 | Sekino et al. | 477/99 |

* cited by examiner

Primary Examiner—Rodney H. Bonck
(74) Attorney, Agent, or Firm—Michael D. Smith

(57) ABSTRACT

An integrated gear shift selector switch assembly for an automotive vehicle includes a park position switch and a brake transmission shift interlock switch combined in a unitized housing as an integrated structure. The park position switch has a movable component that moves within the housing between a park and non-park position corresponding to a movement of a gear shift selector lever from a park to at least one non-park position. The brake transmission shift interlock switch also has a movable component supported by the switch housing for movement in to and out of selective locking engagement with the movable component of the park position switch to selectively unlock and lock the gear shift selector lever in the park position.

11 Claims, 3 Drawing Sheets

INTEGRATED POSITION SWITCH/BRAKE TRANSMISSION SHIFT INTERLOCK COMPONENT

This application claims the benefit of U.S. Provisional Application No. 60/368,333, filed Mar. 27, 2002.

TECHNICAL FIELD

The present invention relates generally to an automobile shift column component, and more particularly, to an integrated shift column component combining a park position switch and a brake transmission shift interlock (BTSI).

BACKGROUND OF THE INVENTION

An automatic vehicle transmission typically includes a shift column having a shift lever that allows a driver to manually switch the transmission between various positions, such as a park, reverse, neutral, drive, and overdrive position, to name but a few. The shift lever contacts a park position detent such that the lever may be selectively held in the park position. In order to avoid a situation where the shift lever is moved from the park to another non-park position, such as the drive position, while an accelerator pedal is depressed which causes the vehicle to inadvertently move forward, various park-lock mechanisms have been developed. Traditionally, park-lock mechanisms included a separate park position switch and brake transmission shift interlock (BTSI), both of which contribute to control movement of the shift lever out of the park position.

Although park-lock mechanisms having separate park position switch and BTSI components have successfully been used throughout the industry, there are certain disadvantages associated with such non-integrated designs. For instance, the non-integrated design reduces the amount of space in the knee bolster area, thereby limiting the stroke of the occupants knees and feet during a collision. Moreover, providing a separate park position switch and BTSI increases the mass, number of parts, assembly time, labor, and cost of the shift column. Also, the combined amount of space required to accommodate the separated components is greater than the amount required to accommodate an integrated component, thus, the non-integrated design reduces the flexibility when designing a shift column.

Furthermore, traditional BTSI designs typically do not provide any separate mechanical override feature. In emergency situations, such as battery failure, a BTSI lacking such a feature would allow the drive to bypass the BTSI and move the shift lever out of the park position detent without depressing the brake pedal and inserting a key into the ignition, as is normally required. Traditionally designed BTSIs are typically located too far forward on the shift column to provide for a mechanical override.

Moreover, current BTSI designs allow the shift lever to move fore and aft while still in the park position detent, thus creating an undesirable amount of play, or stack, in the shift lever. If a driver engages the shift lever in such a system without depressing the brake pedal, even through the shift lever is not removed from the park position detent, there is often times enough play that the park position switch will misinterpret the status of the shift lever. Accordingly, the digital PRNDL or other instrumentation may be sent a signal indicating that the shift lever is no longer in the park position even though it actually is.

It is an object of the present invention to overcome or greatly minimize the foregoing limitations of the prior art.

SUMMARY OF THE INVENTION

An integrated gear shift selector switch assembly for an automotive vehicle includes a park position switch that is integrated with a brake transmission shift interlock switch. The park position switch has a movable component that is connectable to a gear shift selector lever of the vehicle which is movable by an operator of the vehicle between a park position and at least one non-park position. The movable component is movable within a switch housing of the assembly in response to movement of the gear shift selector lever between a park position corresponding to the associated park position of the gear shift selector lever, and at least one non-park position corresponding to the at least one associated non-park position of the gear shift selector lever. The brake transmission shift interlock switch also has a movable component supported by the switch housing for movement into and out of locking engagement with the movable component of the park position switch to disable and enable, respectively, movement of the movable component of the park position switch from the park position in response to selective actuation of a brake pedal of the vehicle to lock and unlock, respectively, the gear shift selector lever in the park position.

By combining the park position switch and brake transmission shift interlock switch in one unitized modular assembly, fewer parts are required and the assembly is all more compact than would be separate switches.

Another advantage of the modular switch assembly is that the small package can be combined quite easily into a steering column while leaving plenty of room for other components.

According to a preferred feature, the modular switch includes a mechanical override feature which enables the park position switch to be unlocked independent of the normal operation of the brake transmission shift interlock switch in the event of a battery failure, or the like.

These and other advantages will become more readily apparent when viewed in connection with the ensuing description and drawings.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
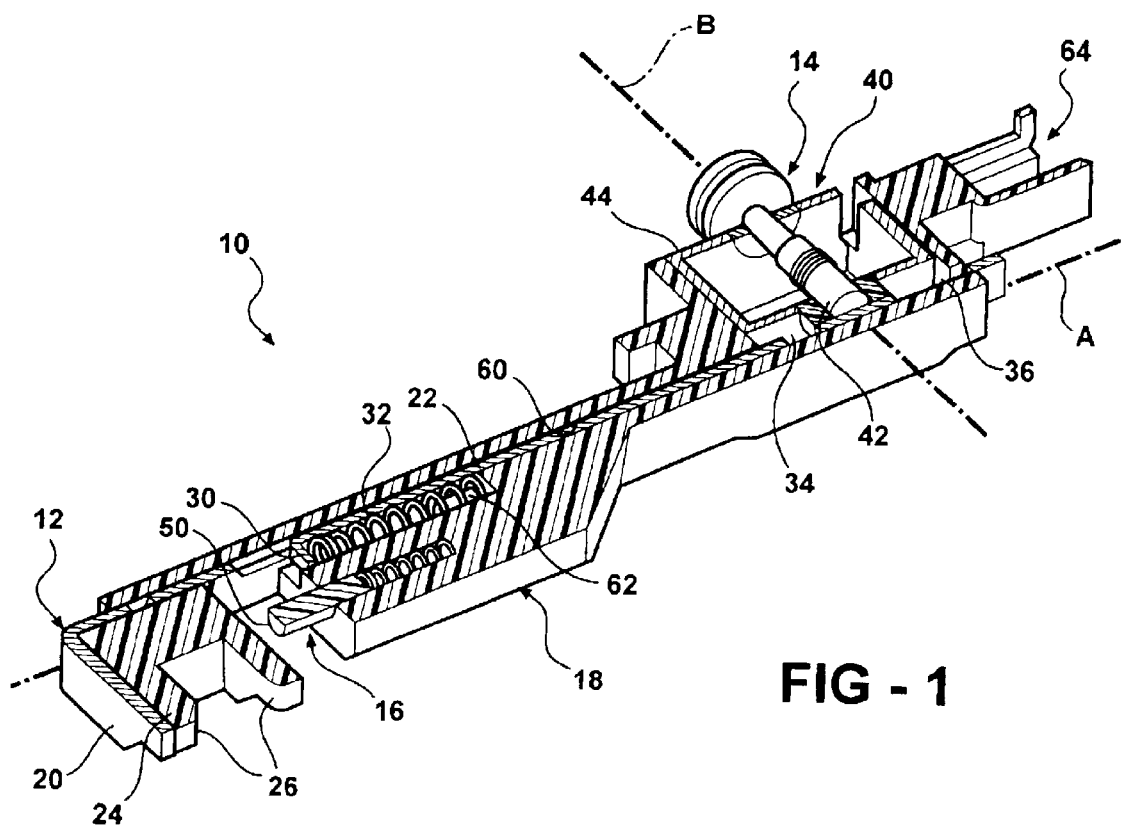
FIG. 1 is a partial sectional view of the integrated switch.

Referring now to FIG. 1, there is seen a cutaway view of an embodiment of the integrated shift column BTSI/park position switch device or gear shift selector assembly 10 constructed according to the present invention which extends along a longitudinal axis A and generally includes a slider 12, a brake transmission shift interlock (BTSI) 14, a park position switch 16, and a housing 18. Slider 12 is an elongated 'L-shaped' component that axially slides within a channel of housing 18 and includes an end section 20 and a main section 22. End section 20 extends at approximately a 90° angle to main section 22 such that it securely retains a 'U-shaped' tang receiver 24, which may either be a separate component or integrally formed with the slider. The tang receiver is shaped to receive a protruding tang or clevis arm of the shift lever, as will be subsequently explained, and has rounded interior corners 26. Main section 22, which extends along axis A, includes a perpendicularly extending slider tab 30 for receiving an axial end of a spring 32. At an axial position rearward of the slider tab 30, the main section 22 is notched out such that a locking hole 34 is formed to receive a locking pin, as will subsequently be explained. At an axial position rearward of the locking hole 34, a stopping hole 36 is notched in the main section 22 and captures a separate stopping tab such that the slider 12 is limited in its axial movement to the range of travel of the stopping tab within the stopping hole 36.

Figure 2:
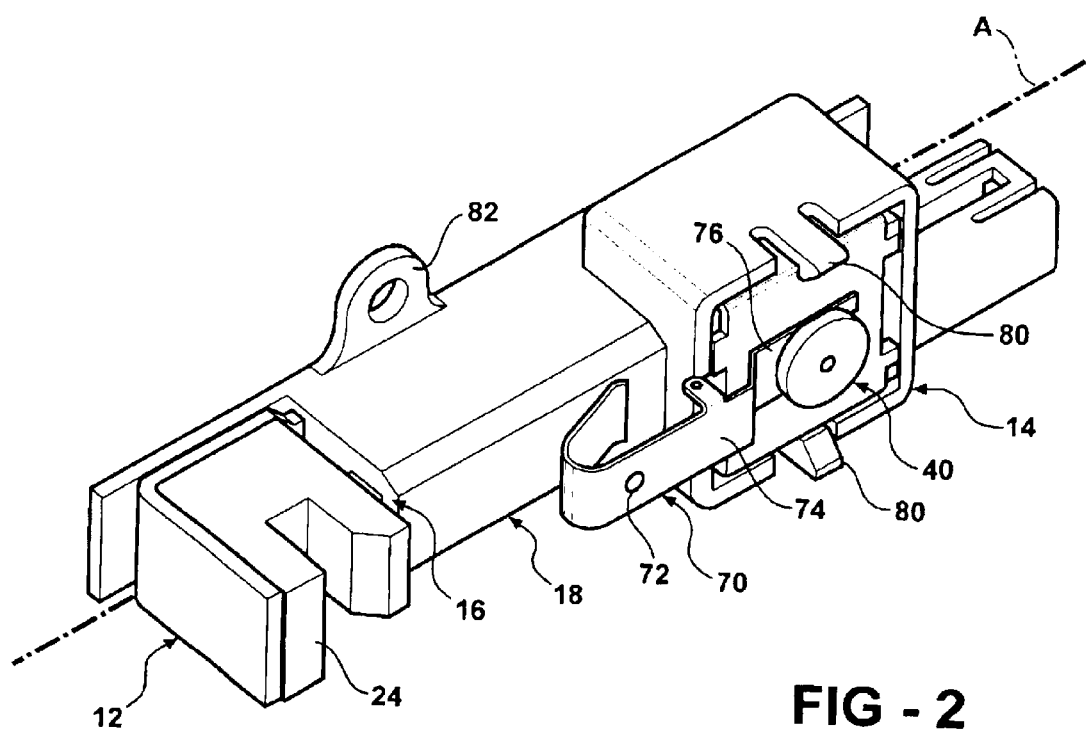
FIG. 2 is a an assembled view for another version of the switch.

The brake transmission shift interlock (BTSI) 14 is located at an axial position near the rearward end of the main section 22 and interacts with the locking hole 34 such that the BTSI 14 may selectively restrict axial movement of the slider 12. FIG. 1 shows the BTSI 14 located on the opposite side of the slider 12 as that of the tang receiver 24, although the BTSI 14 could be located on the same side of the slider 12, that is, it could be rotated 180° about axis A, as shown in FIG. 2. The BTSI 14 extends along an axis B, which is generally perpendicular to axis A, and includes a solenoid 40, a locking pin 42, a lock spring, and a housing 44. The solenoid 40 is operative to selectively generate an electromagnetic field to create a force that drives the locking pin in a direction along axis B against the force of the spring. According to a first embodiment, the spring constantly biases the locking pin 42 outward toward the main section 22 of the slider 12 while the solenoid 40, upon being energized, retracts the locking pin 42 up into housing 44 and away from the slider 12. Alternatively, the spring could bias the locking pin 42 inwardly away from the slider main section 22 in which case the solenoid 40, upon being energized, would cause the pin 42 to extend outwardly toward the slider 12. Either embodiment could be utilized by the integrated shift column assembly 10 of the invention. The housing 44 surrounds and protects the solenoid 40, spring 32, and locking pin 42 and includes a hole for the locking pin 42 to extend through.

Park position switch 16 is used to sense when the shift lever is in a park position and includes a switch plunger 50 and electrical contacts. The switch plunger 50 is biased to an extended position, such as that shown in FIG. 1, and retracts within housing 18 upon contact by a rearward surface of tang receiver 24. Thus, if slider 12, and hence the tang receiver 24, are caused to retract axially within housing 18, the tang receiver 24 will depress the switch plunger 50 thereby causing the electrical contacts to change the electrical state of the switch 16. It should be noted, the electrical contacts could be mounted at numerous locations. For instance, they could be located at the axial end of the switch plunger 50 such that they are the first component contacted by the tang receiver 24, they could be located along the side surfaces of the plunger 50, or they could be located within housing 18. Other locations which achieve the same objective of sensing the position of the plunger 50 to control the electrical state of the park position switch 18 are contemplated by the invention.

Housing 18 at least partially surrounds slider 12, BTSI 14, and park position switch 16 such that those components are secured within a single integrated housing. The housing 18 includes an elongated channel 60, a spring tab 62, and an electrical connector 64. The elongated channel 60 extends along axis A of the housing 18 and receives the slider 12 such that the slider 12 may move axially within the channel 60. The channel 60 includes a widened portion 62 for accommodating the spring 32. The electrical connector 64 is connectable via a suitable mating connector (not shown) to a wiring harness (not shown), or the like associated with the column.

FIG. 2 shows an assembled view of the integrated shift column BTSI park position switch device 10. The structure and operation of FIG. 2 is like that of FIG. 1, except the BTSI 14 and its associated solenoid 40 are on the opposite side of the housing such that the BTSI 14 and tang receiver 24 extend radially in the same direction from the device 10. Also included is a mechanical override device 70. In emergency situations, such as battery failure, the mechanical override 70 enables the driver to bypass the BTSI 214 and to move the shift lever out of the park position detent without having to depress the brake pedal and inserting a key into the ignition, as is normally required. The mechanical override 70 is preferably generally a "J shaped" component having a depression 72, a fulcrum region 74, and a pin disengaging section 76. Minimal depression of section 72 radially inward toward housing 18 such as with a ball point pen or other tool causes the mechanical override to pivot about pivot point 74 such that pin disengaging section 76 moves radially outward away from the housing. Section 76 is connected to the locking pin 42 (not seen), such that radially outward movement of the section 76 causes the locking pin 42 to move away from the housing 18, and hence disengage from locking hole of the slider 12. Once the locking pin has disengaged the locking hole, the slider 12 is free to move axially within the elongated channel 60 (not seen).

Figure 3:
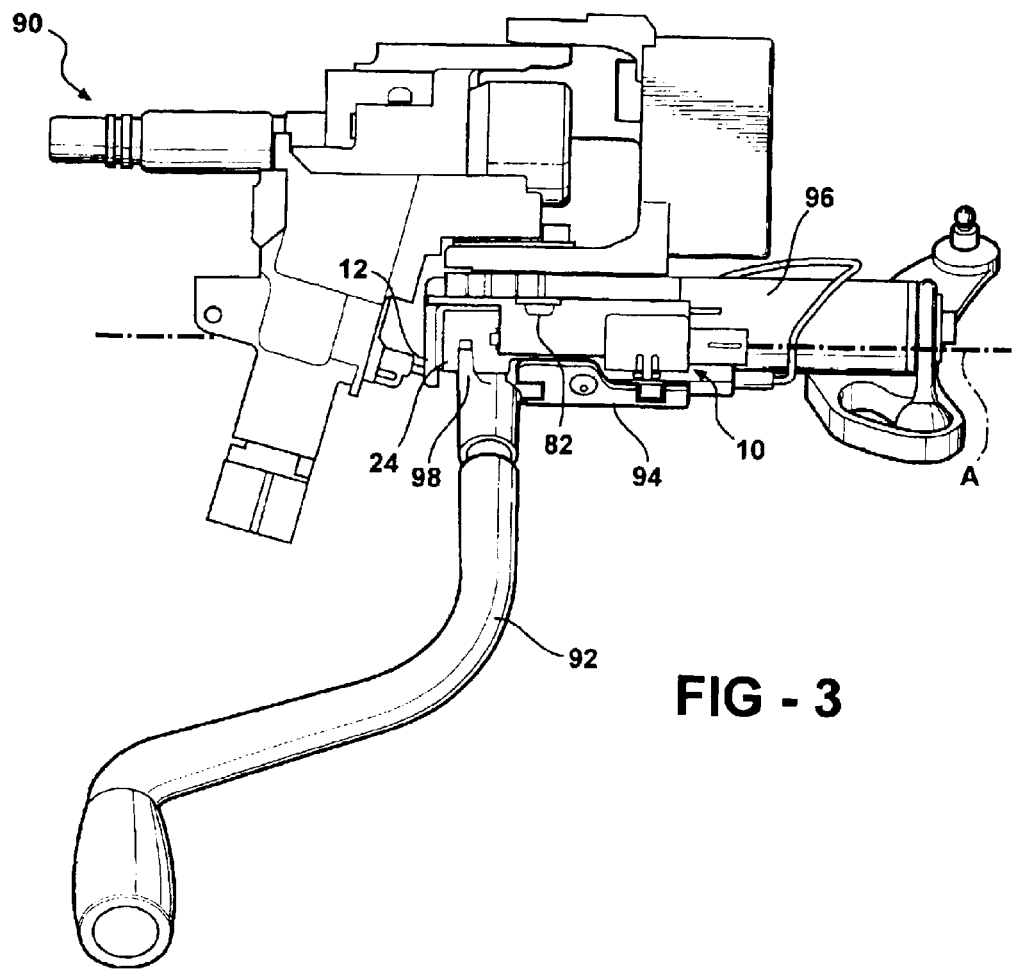
FIG. 3 is a side elevation view of a column assembly shown fitted with the integrated switch of FIG. 2.

FIG. 2 also shows the provision of mounting tabs 80, which extend from housing 18 to mechanically secure the BTSI 14 in place within the housing 18, and a mounting flange 82 for mounting the integrated device 10 to a column assembly, as in FIG. 3.

Referring now to FIG. 3, the embodiment of the integrated device 10 of FIG. 2 is shown installed on a vehicle shift column assembly 90 which generally includes a gear shift selector lever or shift lever 92, a park gate 94, and column section 96. Integrated device 10 is firmly secured to column section 96 via mounting flange 82 and engages park gate 94, as will be subsequently described. Furthermore, tang receiver 24 pivotably engages a tang, or clevis arm, 98 of the shift lever such that when locking pin 42 locks slider 12 in place, the slider 12 cannot move, thereby preventing the tang 98 from pivoting out of the tang receiver 24. However, when the locking pin 42 is not locking the slider 12 in place, the slider 12, and hence the tang receiver 24, is free to move axially toward the driver (to the left in FIG. 3) such that tang 98 is able to pivotally rotate out of the tang receiver 24, thereby freeing the shift lever 92 and allowing the driver to move the lever 92 between the various positions.

Figure 4:
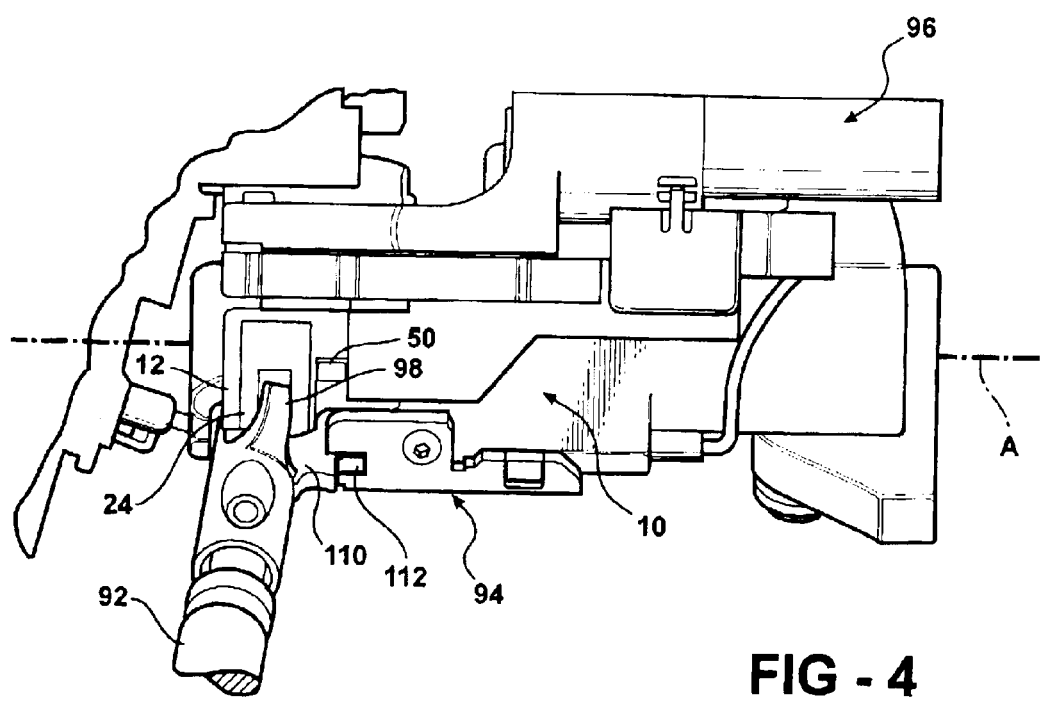
FIG. 4 is an enlarged fragmentary side elevation view of a steering column assembly shown fitted with the integrated switch of FIG. 1.
Figure 5:
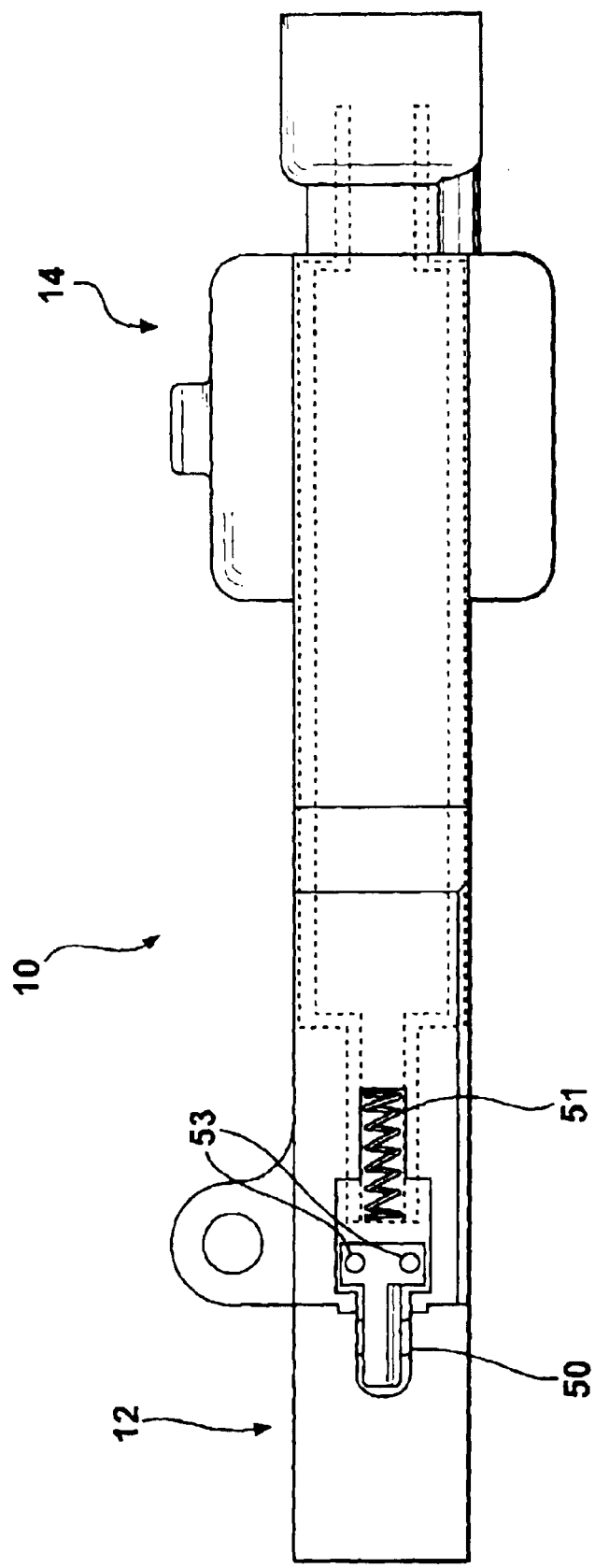
FIG. 5 is a diagrammatic view showing a representative view of the plunger and electrical circuitry of the integrated switch.

Turning now to FIG. 4, the integrated device 10 of FIG. 1 is shown installed on a vehicle shift column having shift lever 92, park gate 94, and column section 96. As evidenced by the extended position of switch plunger 50, the device 10 shown in this view is in the unlocked position, thus the shift lever 92 is free to move between various transmission positions. The tang, or clevis arm, 98 is provided on the end section of shift lever 92, as well as a detent arm, or clevis detent, 110. The end section of the shift lever 92 may either be integrally formed with the shift lever 92 such that it is a single component, or it may be formed from a separate component and secured together through suitable fastening means. The detent arm 110 is designed to be received by a detent receiver 112 notched into park gate 94 such that when the shift lever 92 is in the locked park position, tang receiver 24 engages the tang 98 and the detent receiver 112 engages the detent arm 110 such that the shift lever 92 cannot move.

In operation, the integrated shift column component 10 prevents shift lever 92 from moving out of the park position, unless a brake pedal is depressed. Starting with the locked park position, locking pin 42 of the BTSI 14 extends into locking hole 34 such that slider 12 is held against movement within elongated channel 60 of housing 18. Tang receiver 24 is in a retracted position, that is, in a position where it contacts the housing 18 such that switch plunger 50 is depressed and is forced back into the housing 18. In this position, detent arm 110 is securely received within the complimentary-shaped detent receiver 112 and tang 98 is securely received within tang receiver 24. Thus, the operator of the vehicle is unable to move the shift lever 92 from the park position to a non-park position.

To unlock the shift lever 92 from the park position, the operator depresses the brake pedal sending an electronic signal to the device 10 via electrical connector 64. The electronic signal either reenergizes or de-energizes solenoid 40, depending upon the particular design of the BTSI 14 as was previously explained, such that locking point 42 is retracted form locking hole 34. With the locking pin 42 retracted, slider 12 and tang receiver 24 are free to slide axially within the channel 60 of the housing 18. When the operator draws the shift lever 92 rearwardly toward himself to initiate shifting the lever 92 out of the park position, slider 12 and tang receiver 24 slidably extend rearwardly from the housing 18, as seen in FIG. 4. Once the slider 12, and hence the end section of the shift lever 92, has moved sufficiently rearwardly such that the detent arm 110 is freed from the detent receiver 112, the tang 98 may then be rotated out of the tang receiver 112 as the operator rotates the lever 92 to a select non-park position. Movement of the tang receiver 112 from the housing 18 causes the switch plunger 50 to extend thereby changing the electrical state of the park position switch 16 as the shift lever 92 is rotated to the desired non-park position by the operator. Once the desired position is obtained, the operator releases hold of the lever 92, and it springs forward to reengage the BTSI 14. To reposition the shift lever 92 to the park position, the operator simply pulls back on the lever 92 and rotates the lever 92 back to the park position. Upon releasing the lever 92, it springs forward to drive the sliding 12 forwardly into the housing 18 and resets the detent arm 110 in the detent receiver 112, thereby locking the shift lever 92 in place in the park position.

The simple design of integrated device 10 results in numerous advantages, one of which is the reduction of stack in the overall shift column. The overall stack of the shift column is the aggregate amount of play, which is due to tolerance differences between contacting components, of the various shift column components involved. The more components utilized between the BTSI and the shift lever tang, the greater the overall stack of the system. Conversely, the integrated shift column component 10 of he present invention reduces part count, as the slider directly couples the BTSI and shift lever tang together, and thus reduces the stack of the system. A reduction in stack reduces the amount of fore and aft movement of the shift lever 92 while in the park position detent. If an operator moves a shift lever in a system having a great amount of stack without depressing the brake pedal, even though the shift lever is not removed from the park position detent, there is often times enough stack that the park position switch will misinterpret the status of the shift lever and falsely indicate to the operator that the shift lever has been moved to a non-park position, when in fact it has not. Such a condition is minimized or eliminated with the subject integrated device 10, whose simple and integrated design reduces the overall stack of the shift column.

Obviously, many modifications and variation of the present invention are possible in light of the above teachings. It is, therefore, to be understood that within the scope of the appended claims, the invention may be practiced otherwise than as specifically described. The invention is defined by the claims.

What is claimed is:

1. An integrated gear shift selector switch assembly for an automotive vehicle, comprising:

a park position switch having a movable component connectable to a gear selector lever of the vehicle movable by an operator of the vehicle between a park position and at least one non-park position, said movable component being movable within a switch housing in response to movement of the gear selector lever between a park position corresponding to the associated park position of the gear selector lever, and at least one non-park position corresponding to the at least one associating non-park position of the gear selector lever; and a brake transmission shift interlock switch having a movable component supported by said switch housing and moveable within said switch housing into and out of locking engagement with said movable component of said park position switch to disable and enable, respectively, movement of said movable component of said park position switch from said park position in response to selective activation of a brake pedal of the vehicle to lock and unlock, respectively, the gear selector lever in the park position, said movable components of said park position and said brake transmission shift interlock switch, when in said locking engagement, providing a positive immovable lock and thereby being free of any camming surfaces or features that would permit an override of said locking engagement to cause said moveable components to move out of said locking engagement in response to application of an override sliding force in either direction on said moveable component of said park position switch.

2. The assembly of claim 1, wherein said movable component of said park position switch comprises a slider member slidable within said switch housing.

3. The assembly of claim 2, wherein said movable component of said brake transmission shift interlock comprises a lock pin movable transversely of said slider member into and out of said locking engagement with said slider member.

4. The assembly of claim 3, wherein said lock pin is coupled to and movable by a solenoid.

5. The assembly of claim 3 including a mechanical override mechanism operatively coupled to said lock pin for selectively moving said lock pin out of said locking engagement with said slider member independently of operation of said solenoid or of sliding movement of said slider member.

6. The assembly of claim 5, wherein said mechanical override mechanism is mounted for pivotal movement about a fulcrum on said switch housing.

7. The assembly of claim 6 wherein said override mechanism is generally "J-shaped" with the J-shaped override mechanism engaging said switch housing on one side of said fulcrum and the other leg coupled to said lock pin on the opposite side of said fulcrum.

8. The assembly of claim 2 wherein said slider member is connectable at one end to the gear selector lever and is constantly spring biased toward sliding movement out of said switch housing toward said one end.

9. The assembly of claim 2 wherein said slide member includes a notched receiver at one end of the slider member for positive connections with the shift lever in both axial directions of sliding movement of said slide member.

10. The assembly of claim 9 including a spring acting between said switch housing of said park position switch and said slider member to constantly bias said slider member toward said notched receiver end of said slider member.

11. The assembly of claim 1, wherein said assembly is mounted on a steering column of the vehicle.

* * * * *